United States Patent
Nagendran et al.

(10) Patent No.: US 11,489,894 B2
(45) Date of Patent: Nov. 1, 2022

(54) RATING INTERFACE FOR BEHAVIORAL IMPACT ASSESSMENT DURING INTERPERSONAL INTERACTIONS

(71) Applicant: MURSION, INC., San Francisco, CA (US)

(72) Inventors: Arjun Nagendran, San Mateo, CA (US); Scott Compton, Carrboro, NC (US); William C. Follette, Verdi, NV (US)

(73) Assignee: MURSION, INC., San Francisco, CA (US)

( * ) Notice: Subject to any disclaimer, the term of this patent is extended or adjusted under 35 U.S.C. 154(b) by 0 days.

(21) Appl. No.: 17/311,494

(22) PCT Filed: Feb. 19, 2019

(86) PCT No.: PCT/US2019/018523
§ 371 (c)(1),
(2) Date: Jun. 7, 2021

(87) PCT Pub. No.: WO2020/171798
PCT Pub. Date: Aug. 27, 2020

(65) Prior Publication Data
US 2022/0021716 A1  Jan. 20, 2022

(51) Int. Cl.
*H04L 65/403* (2022.01)
*G06T 7/246* (2017.01)
(Continued)

(52) U.S. Cl.
CPC .......... *H04L 65/403* (2013.01); *G06F 3/0484* (2013.01); *G06T 7/246* (2017.01); *G06T 7/73* (2017.01); *G06T 11/206* (2013.01); *G06V 20/46* (2022.01); *G06V 40/171* (2022.01); *G10L 15/02* (2013.01); *G10L 25/78* (2013.01); *H04L 65/1069* (2013.01); *A63F 13/798* (2014.09); *A63F 13/87* (2014.09); *G06F 3/0487* (2013.01); *G06T 2207/30201* (2013.01)

(58) Field of Classification Search
CPC ..................................................... H04L 65/403
USPC ........................................................ 715/756
See application file for complete search history.

(56) References Cited

U.S. PATENT DOCUMENTS 9,865,281 B2 * 1/2018 Dow .................... H04L 65/403
10,893,236 B2 * 1/2021 Seko .................... G10L 17/26
(Continued)

OTHER PUBLICATIONS

Jake Paul, "Hot boys & girls rate each other 1-10!!(game)", available online at [https://www.youtube.com/watch?v=2hOXN-qzwRQ], published on Dec. 27, 2018. (Year: 2018).*
(Continued)

*Primary Examiner* — Reza Nabi
(74) *Attorney, Agent, or Firm* — ArentFox Schiff LLP

(57) ABSTRACT

A rating interface system and method are provided that allow human users to continuously rate the impact they or other human users and/or their avatars are having on themselves or others during interpersonal interactions, such as conversations or group discussions. The system and method provide time stamping of users' ratings data and audio and video data of an interaction, and correlate the ratings data with the audio and video data at selected time intervals for subsequent analysis.

22 Claims, 9 Drawing Sheets

(51) Int. Cl.

| | | |
|---|---|---|
| *G06T 7/73* | (2017.01) | |
| *G06V 40/16* | (2022.01) | |
| *G06V 20/40* | (2022.01) | |
| *G06F 3/0484* | (2022.01) | |
| *G06T 11/20* | (2006.01) | |
| *G10L 15/02* | (2006.01) | |
| *G10L 25/78* | (2013.01) | |
| *H04L 65/1069* | (2022.01) | |
| *A63F 13/798* | (2014.01) | |
| *A63F 13/87* | (2014.01) | |
| *G06F 3/0487* | (2013.01) | |

(56) References Cited

U.S. PATENT DOCUMENTS

| | | | | |
|---|---|---|---|---|
| 2013/0073387 A1* | 3/2013 | Heath | ................ | G06Q 30/02 705/14.53 |
| 2013/0073389 A1* | 3/2013 | Heath | ................ | G06Q 30/02 705/14.54 |
| 2013/0073400 A1* | 3/2013 | Heath | ................ | G06Q 50/01 715/738 |
| 2013/0073473 A1* | 3/2013 | Heath | ................ | G06Q 30/0241 705/319 |
| 2013/0300900 A1* | 11/2013 | Pfister | ................ | G06V 40/176 348/239 |
| 2014/0074824 A1* | 3/2014 | Rad | ................ | G06Q 30/02 707/722 |
| 2014/0176665 A1 | 6/2014 | Gottlieb | | |
| 2015/0193718 A1 | 7/2015 | Shaburov et al. | | |
| 2017/0061967 A1* | 3/2017 | Dow | ................ | G06V 40/176 |
| 2017/0061989 A1* | 3/2017 | Dow | ................ | H04L 12/1831 |
| 2018/0150205 A1* | 5/2018 | Rad | ................ | G06F 3/0482 |
| 2018/0151192 A1* | 5/2018 | Dow | ................ | G10L 15/30 |
| 2018/0292981 A1* | 10/2018 | Rad | ................ | G06F 3/0482 |
| 2019/0179516 A1* | 6/2019 | Rad | ................ | G06Q 10/10 |
| 2019/0251359 A1* | 8/2019 | Pranger | ................ | G06V 40/174 |
| 2020/0145615 A1* | 5/2020 | Seko | ................ | G06N 20/00 |
| 2021/0042507 A1* | 2/2021 | Raviv | ................ | G06V 20/40 |
| 2021/0073526 A1* | 3/2021 | Zeng | ................ | G06V 40/176 |
| 2021/0192549 A1* | 6/2021 | Sinha | ................ | G06Q 30/0204 |
| 2022/0021716 A1* | 1/2022 | Nagendran | ................ | G10L 15/02 |

OTHER PUBLICATIONS

International Search Report and Written Opinion, issued by International Searching Authority in corresponding International Application No. PCT/US2019/018523, dated May 7, 2019.

* cited by examiner

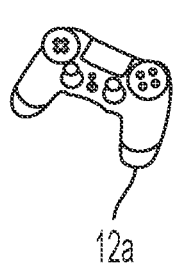
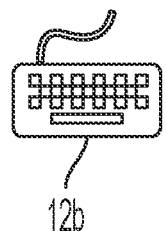
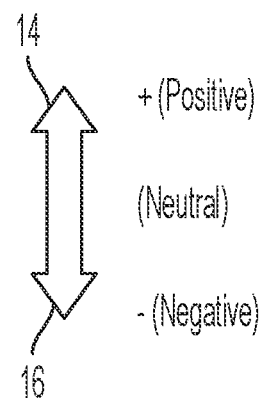
FIG. 1A
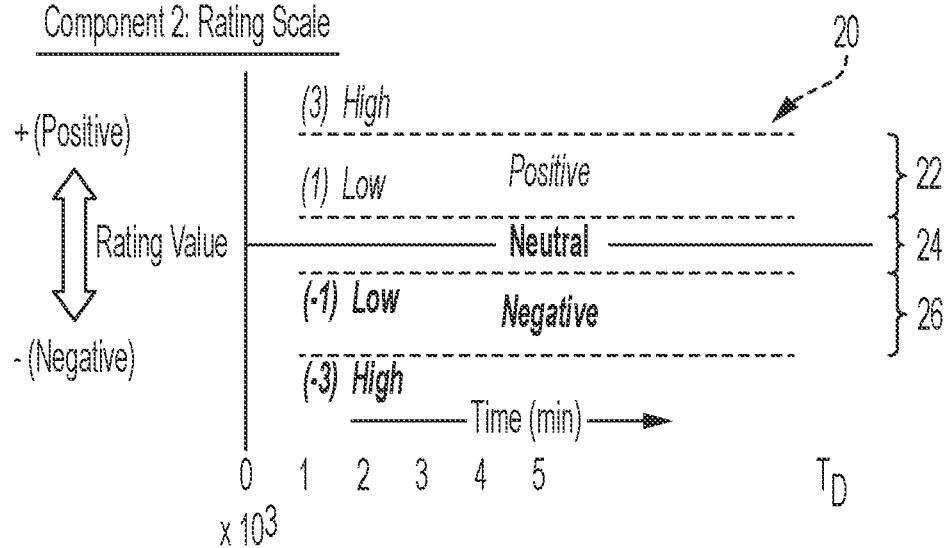
FIG. 1B

|  | Avatars | Learner |  |  | Learner | Learner |
|---|---|---|---|---|---|---|
| Correlation found: | ssfformant | lnsdpitch |  | Correlation found: | lis time | pauses |
| Correlation found: | lis time | lis time |  | Correlation found: | lis time | mn int |
| Correlation found: | lis time | spk time |  | Correlation found: | spk time | art rate |
| Correlation found: | lis time | pauses |  | Correlation found: | spk time | mn int |
| Correlation found: | lis time | mn int |  | Correlation found: | spk time | sd_pch |
| Correlation found: | lis time | sd_pch |  | Correlation found: | art rate | mn int |
| Correlation found: | spk time | mn int |  | Correlation found: | art rate | sd_pch |
| Correlation found: | art rate | mn int |  | Correlation found: | mn pitch | mn_ffmnt |
| Correlation found: | art rate | sd_pch |  | Correlation found: | mn pitch | rms rdot |
| Correlation found: | mn_ffmnt | sd_pch |  | Correlation found: | mn pitch | std rdot |
|  |  |  |  | Correlation found: | mn int | sd_pch |
|  |  |  |  | Correlation found: | energy | rms rdot |
|  |  |  |  | Correlation found: | energy | rms ydot |
|  |  |  |  | Correlation found: | energy | std rdot |
|  |  |  |  | Correlation found: | rms rdot | rms ydot |
|  |  |  |  | Correlation found: | rms rdot | std rdot |
|  |  |  |  | Correlation found: | rms pdot | std pdot |
|  |  |  |  | Correlation found: | rms ydot | std rdot |

FIG. 7

RATING INTERFACE FOR BEHAVIORAL IMPACT ASSESSMENT DURING INTERPERSONAL INTERACTIONS

CROSS REFERENCE TO RELATED APPLICATIONS

This application is a National Stage Entry of International Patent Application No.: PCT/US2019/018523, filed Feb. 19, 2019, the disclosure of which is expressly incorporated herein in its entirety by reference.

STATEMENT REGARDING FEDERALLY SPONSORED RESEARCH OR DEVELOPMENT

N/A

BACKGROUND

Simulation systems exist for enabling remote interactions between people, including with the use of one or more avatars. Such systems use video and audio connections and, when avatars are used, controlling algorithms for the avatars. Pre-recorded models and machine learning algorithms are used to recognize emotions in humans in simulations. However, such models and algorithms are often not accurate and lack contextual information about the interpersonal interactions.

SUMMARY

A rating interface system and method are provided that allow human users to continuously rate the impact they or other human users and/or their avatars are having on themselves or others during interpersonal interactions, such as conversations or group discussions. Each user can provide a rating using an input device, such as a joystick-like interface, keyboard, mouse, or any other user interface device capable of differentiating numeric values. The ratings are time stamped as they are input, divided into bands that represent, for example, positive impact, neutral impact or negative impact, and can be displayed on a rating scale. Each band can have values that are indicative of low, medium, or high impact (or any numeric variation thereof). The rating(s) can be provided over the entire duration or any portion(s) of the interaction and, since they are time stamped, rating values can be discerned for any time instant of the interaction.

The system can also collect audio and video data of each participant during the interpersonal interaction. The collected audio and video data is also time-stamped for synchronization with the ratings input by each user. The rating data at any time instant can be correlated with the audio and video data to extract a relationship between them. For example, a positive impact discerned at a specific time instant in the rating scale may correlate to a person smiling in the video stream around the same instant or a person exhibiting warmth in the tone and pitch of their voice while saying "thank you."

In this manner, the rating interface system and method can use real time human data about another human's perceived impact to help with the correlations or analysis of the audio and video data. The real time ratings can serve as labels or indicators of interest points in the audio and video data. The rating interface system and method can provide users with information about their subconscious behaviors through simulations and make them aware of their impact on people in various circumstances encountered in daily life. Users can adapt or change their behavior based on information that they can learn from the system.

DESCRIPTION OF THE DRAWINGS

Reference is made to the following detailed description taken in conjunction with the accompanying drawings in which:

FIG. 1A is a schematic illustration of various suitable user interface devices for use with embodiments of a rating interface system;

FIG. 1B is a schematic illustration of an exemplary rating scale used in conjunction with the interface devices;

FIG. 7 is an example of a table showing correlations between an avatar and a learner on the left and between two learners on the right.

DETAILED DESCRIPTION

Figure 1C:
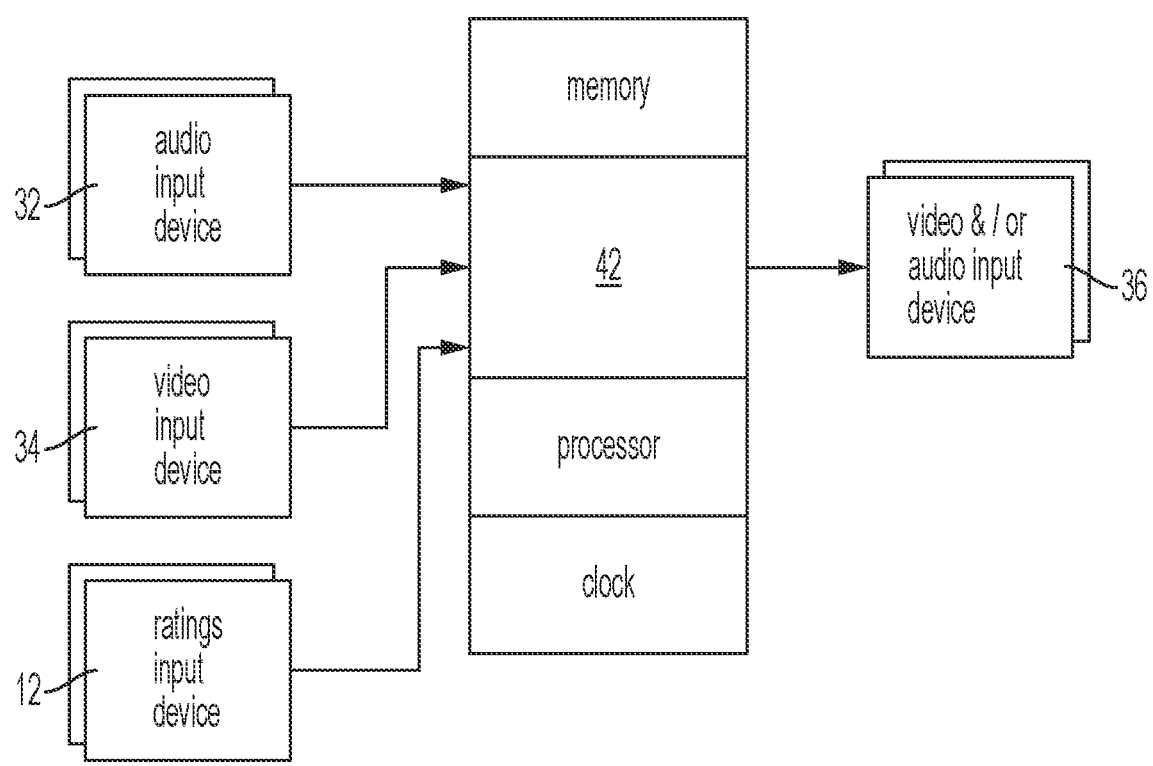
FIG. 1C is a schematic illustration of an embodiment of a rating interface system.

Embodiments of a rating interface system 10 and method are described with reference to FIGS. 1A, 1B, 1C, and 2. The system and method can be used in a variety of contexts, such as a video conferencing system 101 and in an avatar-based simulation system 102, both of which are indicated in FIG. 2. For example, in a video conferencing system, User A can interact with Users B and C using video conferencing equipment. Each user can see and hear the other users themselves. In an avatar-based simulation system, one or more of the users can control an avatar, using a suitable control algorithm 103. The other users can see and hear the avatar(s) rather than the human user controlling the avatar. For example, in FIG. 2, User A can control Avatar 1, User B can control Avatar 2, and User C can control Avatar 3. Simulations can be video-based, virtual reality-based, or gaming, training, or role playing simulations, and the like.

Each user of the system is provided with an input device 12. Any suitable input device, analog or digital, that is capable of differentiating numeric values can be used, such as, without limitation, a game controller 12a, keyboard 12b, joystick 1 2c, mouse, trackball, touchpad, touchscreen, keyboard, digital writing tablet, mobile device application, or microphone, or a combination thereof. See FIG. 1A. During interpersonal conversations or group discussions, each user can rate the impact they or other human users are having on themselves or others. For example, using a joystick input device, a user can move the joystick in one direction to indicate a positive rating (arrowhead 14) and in an opposite direction to indicate a negative rating (arrowhead 16). In another example, a user can strike the up arrow key on a keyboard to indicate a positive rating and the down arrow key to indicate a negative rating. The ratings are continuously time stamped during the interaction and can be discretized onto a rating scale 20, as shown in FIG. 1B. The system can provide a time-series (described further below) that complements the rating scale axis so that rating values can be interpreted at any specific time instant. The system can include storage for recording the ratings and time values.

The timestamped values of impact (positive, negative, or neutral) can provide reference points and time windows within which audio and video data of the interaction (described below) can be analyzed. The rating values can also act as labels for the audio and video data, i.e. any audial or visual event that occurred at any time instant in the interaction can be provided with a label of, for example, positive, negative, or neutral, in accordance with the chosen rating scale.

In some embodiments, a rating scale can be represented on a vertical or horizontal axis of a graphical display, which can be shown via any suitable output device, for example, an electronic display device or a printer. In the embodiment shown, the rating scale shows time along the horizontal axis and rating values along the vertical axis. The rating scale can be divided into bands extending horizontally along the time axis and with ratings values arranged along the vertical axis to represent positive impact 22, neutral impact 24, or negative impact 26. Each band can have values that are indicative of low, medium, or high impact, or any numeric variation thereof. The rating can be provided over the entire duration of the interaction or any portion(s) thereof and time stamped so that rating values can be discerned for any time instant of the interaction. The ratings from the input device(s) can be discretized into positive, negative, and neutral bands or sampled using interpolation. The time $T_D$ in FIG. 1B is the duration of the interaction between the users (humans and/or avatars). In some embodiments, the time scale can be in milliseconds with a multiplier (times $10^3$ in the example shown), although other time scales can be used.

Figure 2:
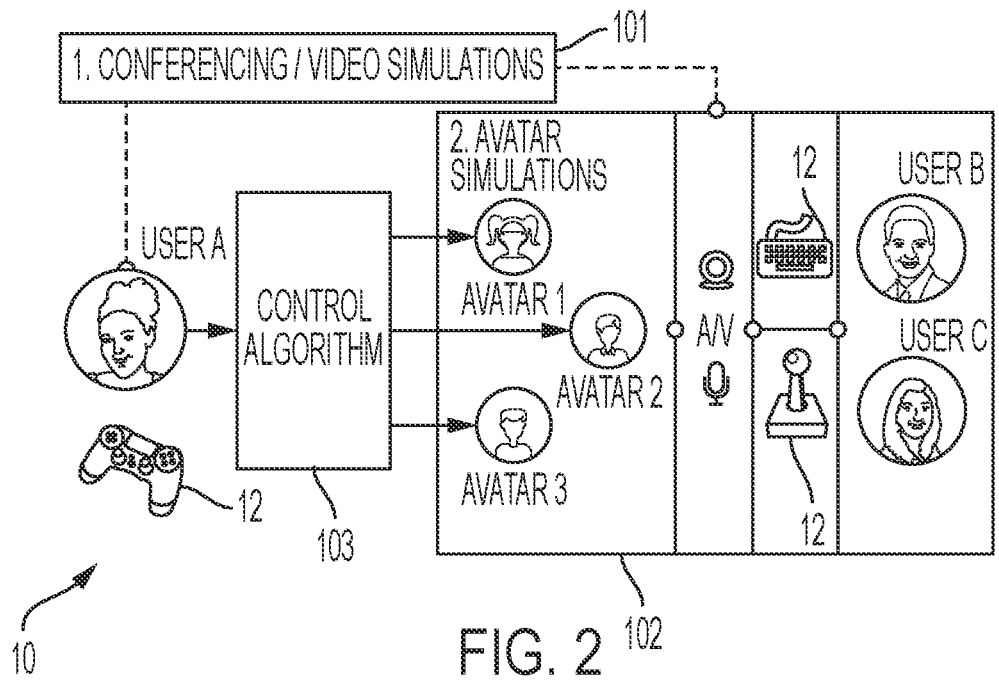
FIG. 2 is a schematic illustration of users participating in an interpersonal interaction including a video conference and an avatar-based simulation.

Referring to FIG. 1C, embodiments of the system can include suitable audio and video hardware input devices 32, 34 to receive and record audio and video data of one or more of the users of the system during an interaction. In some embodiments, any suitable microphone for audio input and video or web camera for video input can be used. The audio and video hardware devices can be selected to minimize the signal to noise ratio, thereby enabling better performance and accuracy in the analysis. The audio and video data for each user of the system can be collected separately from the audio and video data of the other users. The collected data is time-stamped for synchronization with the rating system data described above. In some embodiments, one or more video and/or audio output devices 36 can be provided so that the users can see and/or hear the other human user(s) (for example, in a video conference) or their avatar(s) (for example, in a virtual reality simulation) with whom they are interacting. The devices can be communicatively coupled to any suitable control system 42, which can include one or more processors, clock, and memory, and instructions stored in memory for execution by the one or more processors, described further below. (For simplicity, as used herein, "a processor" or "the processor" can also refer to "one or more processors.")

In this manner, the rating data at any time instant can be correlated with the audio and video data to extract a relationship between them. The time stamped values of impact (positive, negative, or neutral) provide reference points and time windows within which the audio and video data can be analyzed. The rating values can also act as labels for the audio and video data; that is, any audial or visual event that occurred at any time instant in the interaction can have a label of being positive, negative, or neutral in accordance with the chosen rating scale. For example, a positive impact discerned at a specific time instant in the rating scale may correlate to a person smiling in the video stream around the same instant or a person exhibiting warmth in the tone and pitch of their voice while saying, "Thank you."

Figure 3:
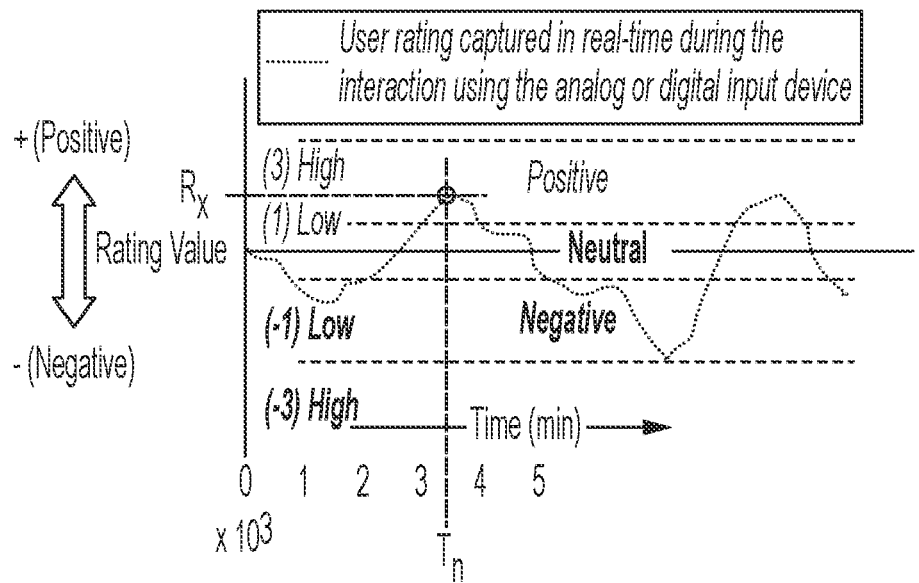
FIG. 3 is a schematic illustration of the rating scale of FIG. 1 showing example ratings from an individual user.

In one example, the system can be used in a video conferencing simulation. Referring to FIG. 2, User A (on the left) can use a video conferencing system to interact with Users B and C (on the right). Each user operates the rating system to track the impact of any speaker on any listener in the system. If User C tracks User A's impact on herself, a graph such as shown in FIG. 3 can result. If User C tracked both User A's impact on herself and User B's impact on herself, two graphs would be produced. In addition, User C could track User A's impact on User B, resulting in three graphs. If each user in this conference did the same, a total of nine graphs would be produced, with each graph conforming to the illustration shown. The input devices can include multiple input elements or switches so that a user can select which user to track and rate.

FIG. 3 is an example of ratings from an individual user. The solid line is a user rating captured in real time during the interaction using the input device. The rating value $R_n$ at time $T_n$ of the interaction between two humans (or one human and one avatar) in the simulation can be determined from the rating graph. It follows that the time $T_n$ at which the rating was $R_n$ can also be determined. Moreover, data can be discretized into the positive, negative, or neutral bands as shown, or sampled using interpolation, thereby supporting both digital and analog input.

In a further example, the system can be used in an avatar simulation system, such as that commercially available from Mursion, Inc. Referring again to FIG. 2, User A (on the left) can use a control algorithm to control avatars in a simulation. Users B and C (on the right) can interact with the avatars in the simulation. Each user can operate the rating system to track the impact of any avatar on any user in the system. For instance, if User A tracked User B's impact on Avatar 1 and User C's impact on Avatar 1, two graphs would be produced. In addition, User B could track his own impact on Avatar 1 and User C could track her own impact on Avatar 1. Avatar 1 would therefore be involved in the creation of four graphs. A total of twelve graphs can therefore be produced for a system with three avatars.

Figure 4:
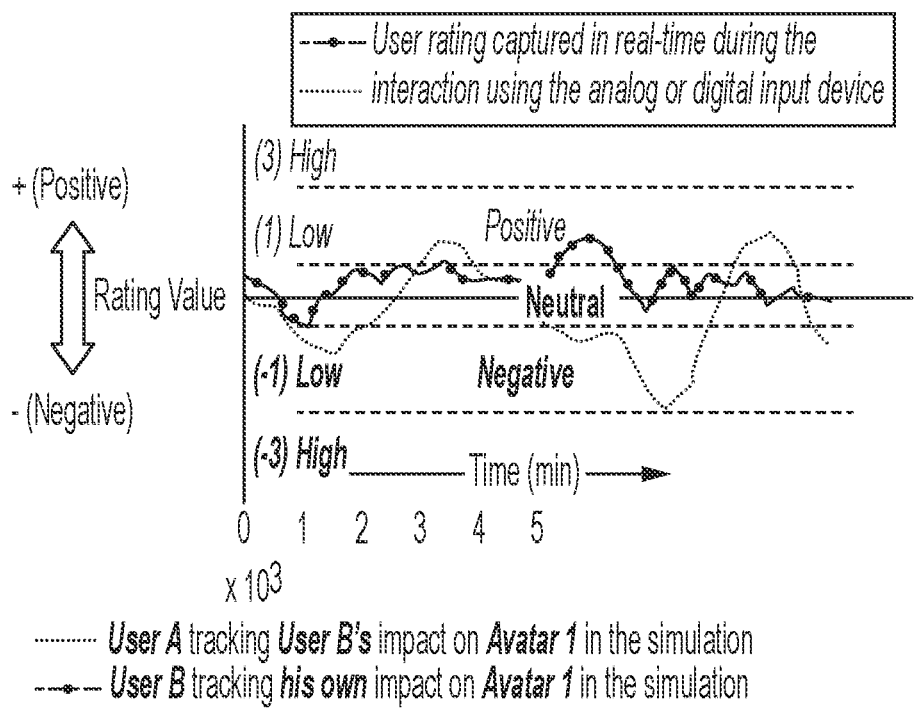
FIG. 4 is a schematic illustration of the rating scale of FIG. 1 showing example ratings from multiple users.

FIG. 4 is an illustration of an example of ratings from multiple users. The lines are user ratings captured in real time during the interaction using the input devices. As an example, the line with dots is User A tracking User B's impact on Avatar 1 in the simulation; the solid line (without dots) is User B tracking his own impact on Avatar 1 in the simulation.

Figure 5:
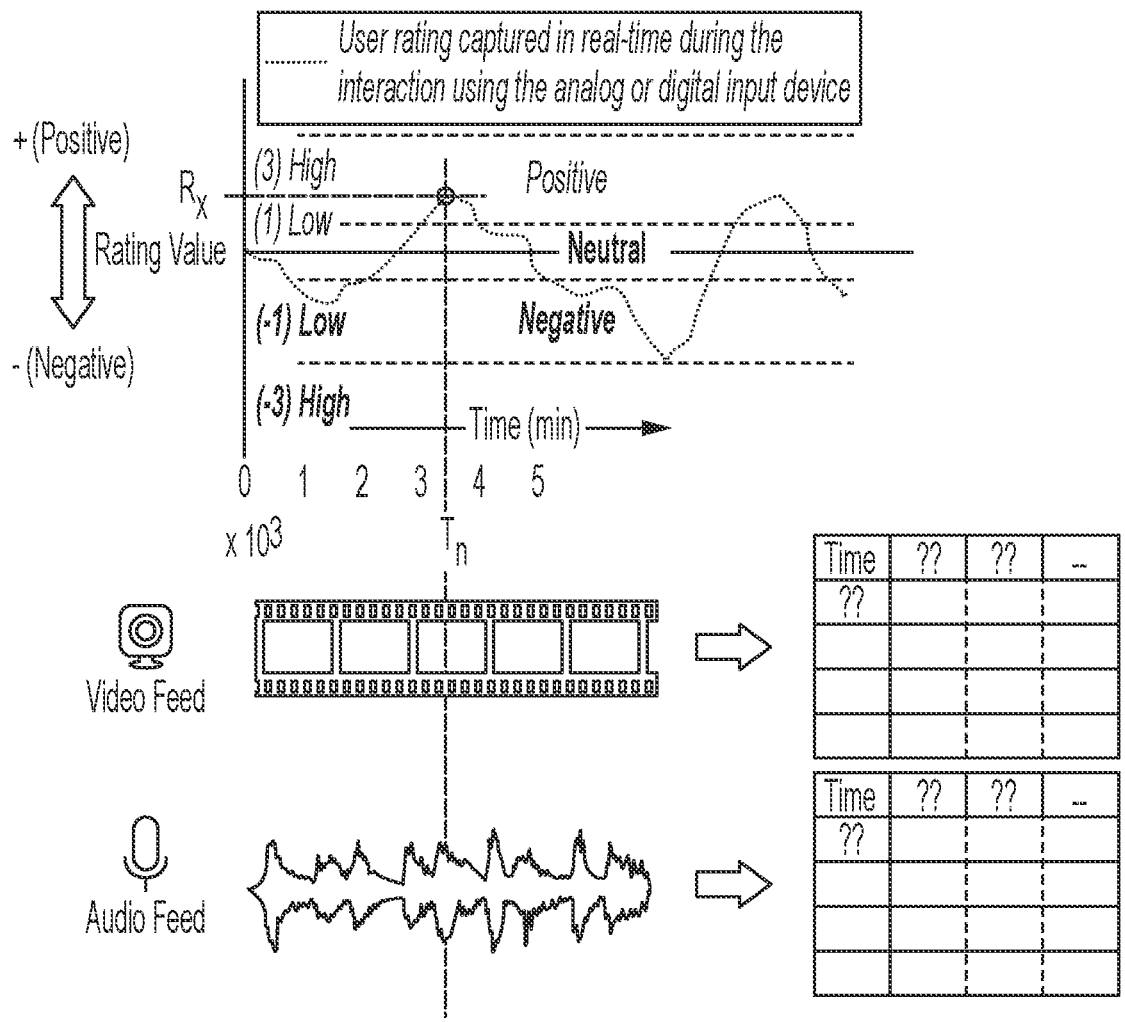
FIG. 5 is a schematic illustration of a correlation of audio and video data with rating values on a rating scale with a rating value of $R_n$ at a time $T_n$.

FIG. 5 is an illustration of correlating audio and video data with the rating values. A rating scale is shown, in which the solid line depicts a user rating captured in real time during the interaction using an input device, as described above. A video feed and an audio feed are also illustrated below the rating scale. Corresponding to the rating value $R_n$ at time $T_n$ of the interaction, synchronized data from the video feed and the audio feed can be analyzed. Extracted visual features from the video frames (such as head roll, head pitch) and audial features from audio waveforms (such as pitch, formants) in a temporal window around $T_n$ can be correlated to the rating value $R_n$ to learn if and how verbal communications and non-verbal communications affect interpersonal conversation.

Figure 6:
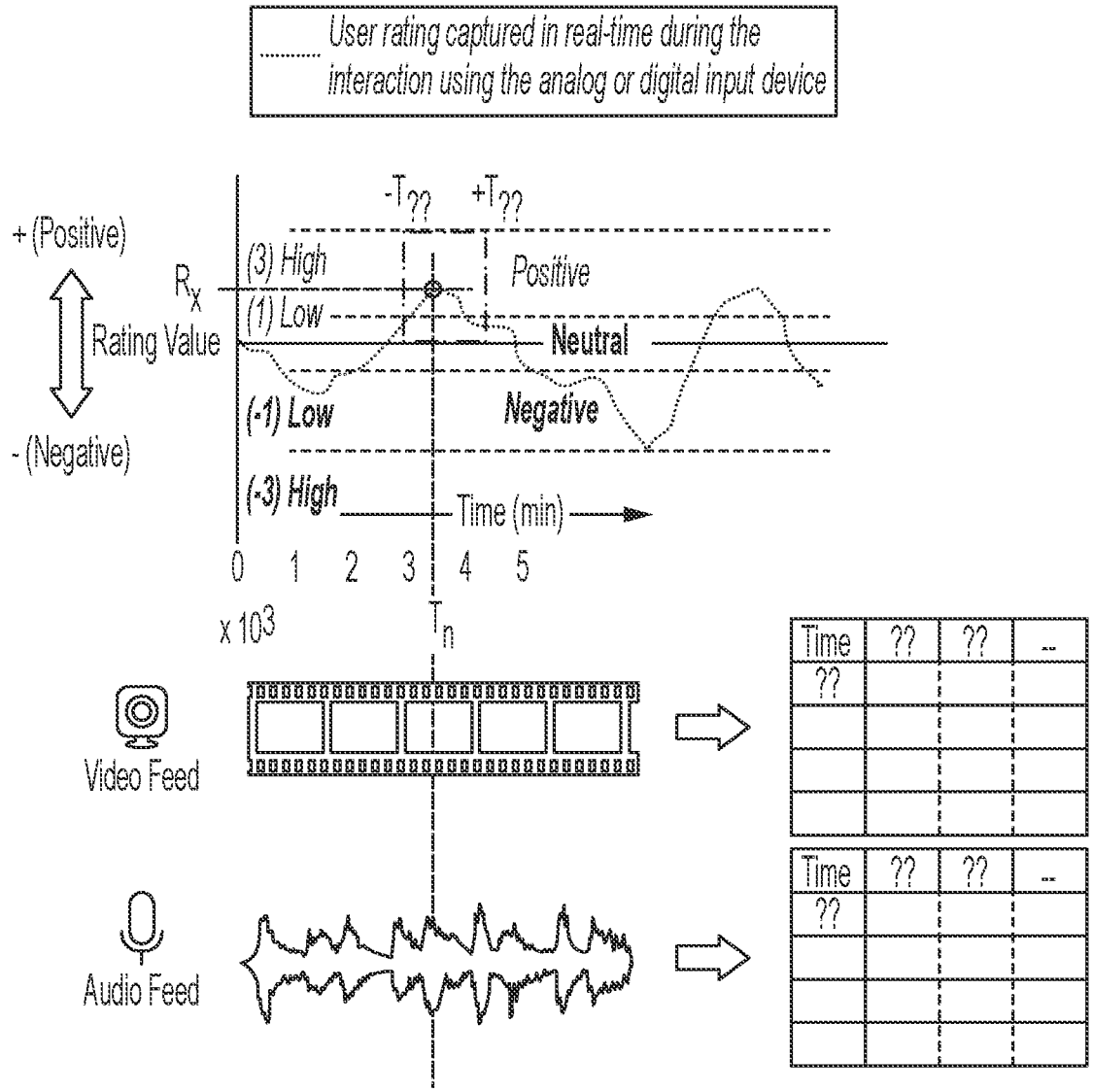
FIG. 6 is a schematic illustration of a correlation of audio and video data with rating values on a rating scale with a rating value of $R_n$ within a time window around time $T_n$.

Referring to FIG. 6, the times $-T_{s1}$ and $+T_{s2}$ define a temporal window around a time of interest $T_n$ that can be used for piece-wise analysis of the audio and video data. The temporal window defined between $-T_{s1}$ and $+T_{s2}$ does not need to be symmetric around $T_n$. $-T_{s1}$ and $+T_{s2}$ are chosen arbitrarily but can be optimized depending on the context of the simulation, since varying values yield varied results for analysis. Typically, several windows of analysis are used to determine the optimal value for the specific context. For example, when causal data is required, the windows could be chosen such that $-T_{s1}$ corresponds to $T_n$ and $+T_{s2}$ is dependent on the time duration for which the effect of the past event needs to be analyzed. For an interaction, suitable audio and video recording equipment is provided, and a peer-to-peer connection is initialized and established between two or more end users. Any suitable system and/or architecture can be used to establish the peer-to-peer connection. The video and audio data can be received and transmitted for processing to a suitable control system. After the interaction has ended, the data can be processed as described in some embodiments as follows. In some embodiments, the audio data and the video data can each be pre-processed before integration with the ratings data.

For example, the audio channel of each user in the peer-to-peer connection can be recorded and the data saved to any suitable storage device. Recording devices should support a minimum range of frequency between 22 KHz and 48 KHz.

For each recorded audio channel, the system can compute the Fast Fourier Transform of the recorded audio signal to determine the frequency components of the signal. The system can perform an acoustic periodicity detection using an autocorrelation technique or any other suitable technique or method. This can be utilized to distinguish voices from other sounds and also to distinguish between vocal signatures and features. The recorded signal can then be analyzed at a suitable sampling rate, for example, by sampling at 1000 Hz (time interval of 1 ms) for desired audial features, such as, without limitation, a pitch of voice, tone of voice, vocal intensity level, vocal formant, voiced segment, unvoiced segment, voice break, silence period, vocal jitter, or vocal shimmer, or a combination thereof.

The extracted features (values) of the audio signal, which were previously time stamped, can be recorded and stored for further processing. This can yield a multi-dimensional time-series vector, sampled, for example, every 10 ms. Extracted pure audio features can include, without limitation: median pitch, mean pitch, SD pitch, maximum pitch, minimum pitch, local jitter, local absolute jitter, RAP jitter, PPQ5 jitter, DDP jitter, local shimmer, local DB shimmer, APQ3 shimmer, APQ5 shimmer, APQ11 simmer, DDA simmer, fraction unvoiced frames, number of voice breaks, degree of voice breaks, mean intensity, minimum intensity, maximum intensity, first formant, second formant, third formant, fourth formant.

The extracted values can be provided as a table or spread sheet in which columns represent various features in the audio signal and the rows correspond to those values extracted in specific time windows, e.g., row 1 can be 0 to 10 ms and row 2 can be is 10 ms to 20 ms, if the time window chosen was 10 ms (−Ts1 to +Ts1). A sample for Pure Audio Features is included below.

Sample features or values can include, for example, emotions, and or derived features, such as shown below:

Emotions:

| Neutrality | Happiness | Sadness | Anger | Fear |
| --- | --- | --- | --- | --- |

Derived Features

| Number of Syllables [nsyll] | Number of Pauses | Duration (seconds) [dur] | Phonation Time (s) [photime] | Speech Rate [nsyll/dur] | Articulation rate [nsyll/photime] |
| --- | --- | --- | --- | --- | --- |

For each dimension of the multi-dimensional time-series vector, the time-stamped data is saved to a file.

The system can then compute the autocorrelation between all the recorded audio signals from different end users (peers):

$$\rho(A,B)=1/(N-1)*\text{sigma}(i=1:N)[A_i-\mu_A)/(\sigma_A)*(B_i-\mu_B)/(\sigma_B)]$$

where:
A and B are column vectors corresponding to one of the above time-stamped values;
$\rho(A,B)$ is the correlation coefficient between the two values A and B;
N is the number of observations corresponding to the number of rows in that column;
$\mu$ is the mean value for each of features A and B; and
$\sigma$ is the standard deviation for each of features A and B.

The system can then find the dimensions of the data where correlations are found, for example, statistically, where the statistical probability value, p-value, is less than a determined threshold value. In some embodiments, p<0.05. In some embodiments, p<0.10. In some embodiments, an analyst can be given discretion to select the p-value. An example is shown in FIG. 7, where the correlations found between the recorded audio of an avatar (1st peer) and the recorded audio of a learner (2nd peer) are shown on the left. The same computation between two learners is shown on the right. It will be appreciated that the results shown in FIG. 7 are exemplary only, and results can vary across datasets and are not generalizable results. By way of example, listening times and speaking times can be computed by summating the periods of the audio signal in which the frequency components have been identified as voiced segments. There are known algorithms included in certain toolkits, such as PRAAT, that facilitate the computation of these values.

The left three columns show the correlation between features that were extracted for the avatar, and the features extracted for the learner, for one specific dataset. Two rows are highlighted as an example. These two rows suggest that a direct correlation exists between the "listening time" of the avatar (i.e., the time the avatar spends listening to the learner) and the "listening time" of the learner (i.e., the time the learner spends listening to the avatar). In other words, the inference is that the longer the learner listens to the avatar, the longer the avatar is likely to listen to the learner and vice-versa. Similarly, a correlation exists between the "listening time" of the avatar and the "speaking time" of the learner. That is, it can be inferred that the avatar was willing to listen more, if the learner spent time talking.

The right three columns illustrate a similar analysis, this time performed between the learners themselves rather than between the avatar and the learners. The highlighted row indicates that there is a correlation between the "speaking time" of the learners and their "articulation rate." The computed articulation rate of the learner is the number of syllables per minute that were uttered by the learner, which can be obtained by analyzing the raw audio streams, as noted above.

In some embodiments, the above computation of correlation can be performed across the entire duration of the interaction, across all audio streams.

Figure 8:
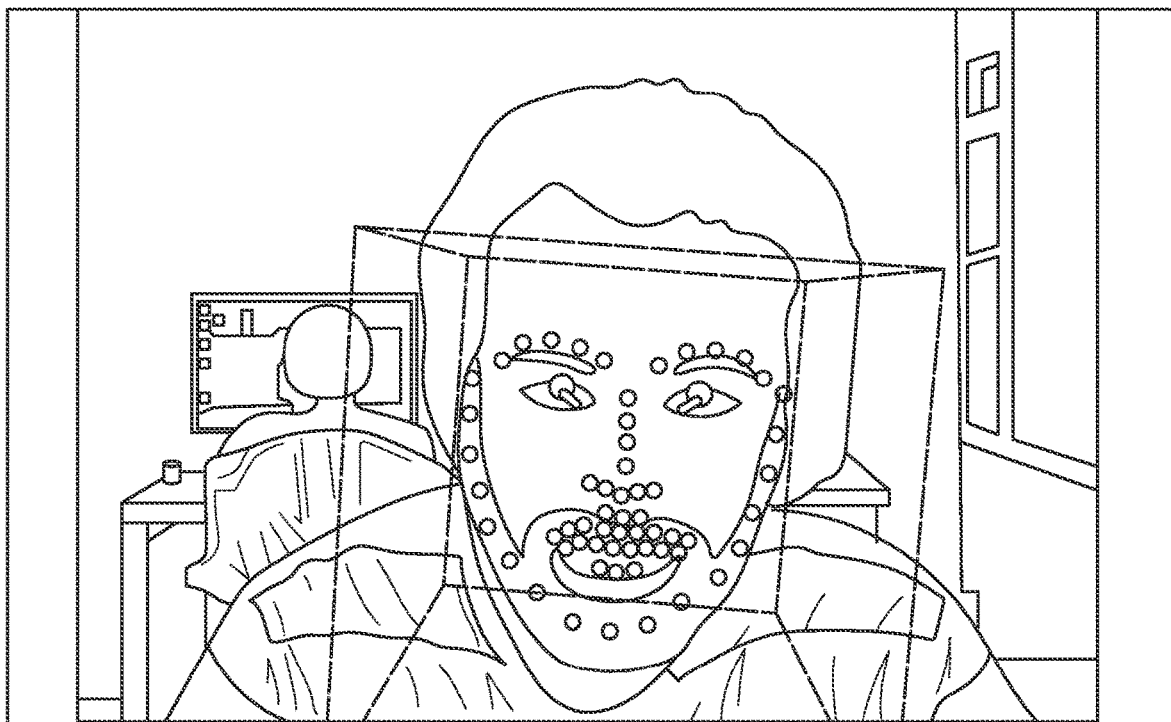
FIG. 8 is a schematic illustration of the detection of facial landmarks and head poses.

In some embodiments, pre-processing of the video data can be performed as follows: The video channel of each user in the peer-to-peer connection is recorded and the data is saved to any suitable storage device. The devices should sample the video data at a rate between 30 to 60 Hz. In some embodiments, for each recorded video channel, the system can employ head pose and facial landmark detectors, based on trained neural networks or the like. Any suitable head pose and facial landmark detector can be used, such as Cambridge Face Tracker or OpenCV. The system can compute the head pose data $[R_x, R_y, R_z]$ (rotation) and $[T_x, T_y, T_z]$ (position) for each frame of the video. Referring to FIG. 8, $T_x$, $T_y$ and $T_z$ are the absolute positional values of the head of the learner in three dimensions with respect to the world-frame of the sensor (or video input device). $R_x$, $R_y$ and $R_z$ are the absolute rotational values of the head of the learner (roll, pitch, and yaw) as observed by the sensor.

Similarly, facial landmark features such as, without limitation, eyebrow positions, nose tip position, eye position, lip position, facial contour positions, head shape, and hair line, are computed for each frame. Each facial feature can be appropriately indexed. For example, each eyebrow can be labeled at five points from the inside, near the nose bridge, to the outside, near the ear, identified as eyebrow_1, eyebrow_2, . . . eyebrow_5. Similarly, the lip can be labeled at points including the lip corners, upper lip middle, and lower lip middle. Face contour points can similarly be labeled and indexed.

This data can be stored as a time-stamped row vector for each frame. The dimensionality of this row of data is dependent on the number of features detected in that frame and in some embodiments, can be as large as 67 points on the face. A confidence value (which can be provided by the head pose and facial landmark detection system) is stored for each frame. Data points with low confidence values, for example, <90%, can be discarded.

For each video stream, the root-mean-square (RMS) value of the angular velocity of the motion of the head (roll, pitch and yaw) can be computed and used as a derived feature. The autocorrelation between the computed RMS values for all the recorded video signals from all the different end users (peers) including any avatars in the scene is computed. In some embodiments, the autocorrelation algorithm can be as described above.

The time-stamped data of all the extracted values (RMS, head pose and facial landmarks) can be saved to a file.

Figure 9:
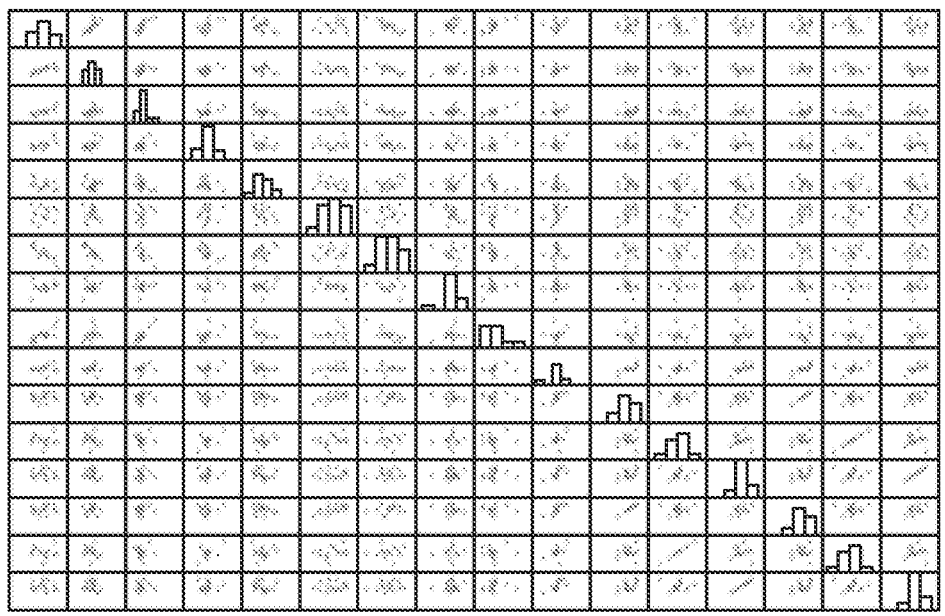
FIG. 9 is an example of a graph of a correlation matrix.

FIG. 9 is a graphical illustration of data of an exemplary correlation matrix. Each row and column corresponds to one of several features extracted from the audio or video streams. The matrix may include both audio and video features wherein each may correlate to the other. For example, the pitch of the voice of a person may increase while exhibiting, or after exhibiting, an angry face. For example, audial features extracted from the audio stream can include pitch of voice, tone of voice, mean intensity level, formants and the like. Visual features extracted from the video stream can include the location of facial landmarks such as the tip of the nose, eyes, mouth, direction of the head, direction of eye gaze, and the like. Each cell in the matrix (each intersection of a row and column) contains as many data points as the number of interactions on which the analysis is performed. Increasing the number of interactions should increase the number of resulting correlations. For example, if 15 interactions are analyzed, there are 15 data points in each cell, each corresponding to 1 of the interactions. If a correlation is found between these 15 points in a cell, then the associated row and column indicate the features that have a correlation across the entire data set of 15 interactions.

Correlations can be performed without relying on the ratings data or the data can be analyzed in the time windows around the ratings. Correlations may be either independent of timing information or dependent on such information.

The rating scale can then be used to provide time windows for further analysis of the audio and video data. For example, the data from the rating scale is already synchronized with the audio and video signals, as described above. The ratings data for the particular interaction between learners can be divided into bands of positive, neutral and negative as described above. The continuous rating scale allows discrete bands of any magnitude to be created. For example, one positive band could be all ratings that are between 3.5 and 4.0. An alternate, but broader positive rating band could be all the ratings that lie between 2.0 and 4.0 and so on.

All the time-values $T_n$ at which the rating $R_n$ falls within the chosen limits of the rating band (as described in the previous stage) are extracted. These time-values serve as windows into the pre-processed audio and video data. Windows can be variable and can range from $+T_s$ and $-T_s$ on either side of the extracted time value $T_n$ (see illustration above).

Variable correlation in the audio and video data is solved for based on varying time windows obtained using, for example, the above-described procedure. Time windows and rating bands can each be varied during the analysis to identify patterns in the data that can be observed at selected time windows and rating amplitudes.

In some embodiments, the rating scale can be used as labels for machine learning. For example, variable correlations that exist in the positive, negative and neutral bands can be identified as indicators of patterns. For every value $R_n$ that lies within a selected rating band, the audial and visual features (extracted as descried above) can be gathered into a large multi-dimensional dataset. Using the value $R_n$ as a target label, a machine learning algorithm can be trained using decision trees or support vector machines. Other such machine learning techniques can be applied to train various models. Suitable models include, without limitation, neural networks and multi-layer perceptrons.

In some embodiments, the learnt model can be verified using cross-validation. Cross-validation uses the approach of dividing a data set into training and testing portions, where a portion of the data set (e.g. 70%) is used to train the model and the rest of the data (30%) is used to test the model. Parameters of the model can be refined based on the results and the data can be re-partitioned randomly to perform iterative cross-validation until a good performance is achieved. Variations including n-fold validation. Other techniques known in the art can be used.

In some embodiments, the model can be adapted and refined using active-learning, in which a rating scale can be used to continuously provide labels to a machine learning algorithm as the data is being gathered during interpersonal interactions.

In some embodiments, a rating system can be used without corresponding audio and video data. In this case, the rating system can give users qualitative data by making them aware of the impact they had on the other person or people during an interaction. The users would not, however, know the cause of the impact in the absence of the audio and video data.

In some embodiments, the audio and video hardware can be combined for recording, and the audio and video data can be later separated in software for analysis.

In some embodiments, the rating interface can be used to collect data of a similar nature during in-person meetings and conferences. For example, embodiments of an interface can be adapted or customized as an app on a smart phone or other device to allow a user to input ratings while having a phone or in-person conversation or a video conference.

The system and method can provide several advantages. For example, in some embodiments, the system can combine qualitative information about the impact of a user's verbal and non-verbal communication on another. The system can utilize a real-time rating system that can serve as labels or indicators of interest points in the data. The system can take in real-time human data about another human's perceived impact to help with the correlations or analysis. The system can utilize real-time human input to identify temporal windows in which to pay attention to the raw audio and video streams. The system can provide labels in the context of the interpersonal communication. Such continuous labeling in real-time of the interaction can be beneficial. With labels that have context and labels that continuously vary with time, it is possible to perform piecewise temporal analysis of the data and provide valuable information to the humans about the nature of their sub-conscious behaviors and the impact it had on other humans or avatars they were interacting with. The audio and video data can be used to provide users with an awareness of their subconscious or unintended behaviors that caused a certain impact on others during the interaction. This can enable users to mold or mend their behaviors in the future as needed.

The system can be implemented in or as part of a computer system that executes programming for processing the ratings input data, audio data, and video data, as described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, cameras, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A system for providing a rating interface during an interpersonal interaction between at least a first user or an avatar thereof and a second user or an avatar thereof, comprising:
    an input device for transmitting ratings data input from the first user of an assessment of the second user during the interpersonal interaction, the input device configured to differentiate user inputs as numerical values; and
    a processor, communicatively coupled to the input device to receive the ratings data, and memory, and machine-readable instructions stored in the memory that, upon execution by the processor cause the system to carry out an operation comprising time stamping the ratings data transmitted from the input device during the interpersonal interaction;
    wherein the processor is operative to process the ratings data from the input device into two or more rating bands, each rating band corresponding to a range of input numerical values received from the input device during the interpersonal interaction;
    wherein the rating bands comprise a positive rating band corresponding to an input positive assessment, a negative rating band corresponding to an input negative assessment, and a neutral rating band corresponding to an input neutral assessment;
    further comprising an output device in communication with the processor, and wherein the processor is operative to provide a graphical representation to the output device of ratings illustrating a time scale along a first axis and a rating scale along a second axis, wherein the rating scale encompasses numerical values received from the input device; and
    wherein the output device comprises a video display or a printer.

2. The system of claim 1, further comprising:
    an audio device for transmitting audio data of the second user or the avatar thereof; and
    a video device for transmitting video data of the second user or the avatar thereof;
    wherein the processor is communicatively coupled to the audio device to receive the audio data and to the video device to receive the video data, and is operative to time stamp each of the audio data and the video data synchronously with the ratings data over a time duration during the interpersonal interaction.

3. The system of claim 2, further comprising:
    a second input device for transmitting ratings data input from the second user of an assessment of the first user or the avatar thereof during the interpersonal interaction, the second input device configured to differentiate user inputs as numerical values;
    a second audio device for transmitting audio data of the first user or the avatar thereof; and
    a second video device for transmitting video data of the first user or the avatar thereof,
    wherein the processor is communicatively coupled to the second input device, the second audio device, and the second video device, and is operative to time stamp each of the ratings data transmitted from the second input device, the audio data transmitted from the second audio device, and the video data transmitted from the second video device synchronously over the time duration during the interpersonal interaction.

4. The system of claim 3, wherein the processor is further operative to:
extract one or more audial and/or visual features of the first user or the avatar thereof and one or more audial and/or visual features of the second user or the avatar thereof; and
determine a correlation between the extracted features of the first user or the avatar thereof and the extracted features of the second user or the avatar thereof.

5. The system of claim 3, wherein the processor is operative to discretize the ratings data from the input device and the second input device into two or more rating bands, each rating band corresponding to a range of input numerical values received from the input device and the second input device during the interpersonal interaction; and
determine one or more time values at which the ratings values fall within a selected one of the rating bands, and a time window around each of the one or more determined time values; and
determine one or more correlations in the audio data and/or the video data between the first user or the avatar thereof and the second user or the avatar thereof within each of the time windows.

6. The system of claim 5, wherein the correlations are between one or more of: vocal features, listening time, speaking time, articulation rate, and pause time.

7. The system of claim 2, wherein the processor is further operative to process the audio data to determine frequency components thereof and to detect a user voice in the audio data.

8. The system of claim 2, wherein the processor is further operative to process the audio data to determine a presence of one or more audial features in the audio data, the audial feature
chosen from a pitch of voice, tone of voice, vocal intensity level, vocal formant, voiced segment, unvoiced segment, voice break, silence period, vocal jitter, or vocal shimmer, or a combination thereof.

9. The system of claim 2, wherein the processor is further operative to process the video data to determine a presence of one or more visual features in the video data, the visual feature chosen from one of: facial landmarks, head pose, eye gaze direction, head motion, or a root mean square (rms) value of head motion, including but not limited to rms values of: orientation of the head, angular velocity of the head, angular acceleration of the head, independently or combinatorially along all three axes (roll, pitch, yaw).

10. The system of claim 2, further comprising storage to store the ratings data transmitted from the input device, the audio data transmitted from the audio device, and the video data transmitted from the video device.

11. The system of claim 1, wherein the processor is further operative to determine one or more visual features from video frames of the video data and/or one or more audial features from audio waveforms of the audio data and extract one or more of the determined features in a time window corresponding with one or more selected rating values.

12. The system of claim 11, wherein the processor is further operative to display the extracted features and correlated ratings at a later time after the interpersonal interaction has ended.

13. The system of claim 11, wherein the processor is further operative to label the extracted features of the audio data and/or the video data with a rating label corresponding to a discretized rating input synchronized with the extracted audial features and/or extracted visual features.

14. The system of claim 1, wherein the input device is chosen from a joystick, game controller, mouse, trackball, touchpad, touchscreen, keyboard, digital writing tablet, mobile device application, or microphone, or a combination thereof.

15. The system of claim 1, further comprising:
one or more video display devices, wherein during the interpersonal interaction, the second user or the avatar thereof is visible to the first user and/or the first user or the avatar thereof is visible to the second user; and/or
one or more audio output devices, wherein during an interpersonal interaction, a voice of the second user or the avatar thereof is audible to the first user and/or a voice of the first user or the avatar thereof is audible to the second user.

16. The system of claim 1, wherein the system is an avatar simulation system or a video conferencing system.

17. An interaction system for providing interpersonal interaction between at least a first user or avatar and a second user or avatar comprising;
the rating interface system of claim 1;
a video display device for displaying the first user or the avatar thereof to the second user and/or the second user or the avatar thereof to the first user during the interpersonal interaction.

18. The interaction system of claim 17, wherein the system comprises an avatar simulation system or a video conferencing system.

19. A method of providing an interpersonal interaction between at least a first user or an avatar thereof and a second user or an avatar thereof, comprising:
providing the interaction system of claim 1;
establishing a peer-to-peer connection between the first user and the second user;
transmitting ratings data from the input device to the processor during an interpersonal interaction;
at the processor, time stamping the ratings data over a time duration of the interpersonal interaction.

20. The method of claim 19, further comprising:
transmitting audio data and/or video data to the processor, and time stamping each of the audio data and the video data synchronously with the ratings data over the time duration of the interpersonal interaction.

21. The method of claim 19, further comprising:
extracting one or more audial and/or visual features of the first user or the avatar thereof and one or more audial and/or visual features of the second user or the avatar thereof, and
determining a correlation between the extracted features of the first user or the avatar thereof and the extracted features of the second user or the avatar thereof.

22. The method of claim 19, further comprising providing a graphical representation to an output device of ratings illustrating a time scale along a first axis and a rating scale along a second axis, wherein the rating scale encompasses numerical values received from the input device.

* * * * *